(12) United States Patent
Truong et al.

(10) Patent No.: US 10,852,494 B2
(45) Date of Patent: Dec. 1, 2020

(54) AVIONICS PLUGGABLE ACTIVE OPTICAL CONNECTOR

(71) Applicant: The Boeing Company, Chicago, IL (US)

(72) Inventors: Tuong K. Truong, Bellevue, WA (US); Eric Y. Chan, Mercer Island, WA (US); Dennis G. Koshinz, Bellevue, WA (US); Kim Quan Anh Nguyen, Seattle, WA (US); Henry B. Pang, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/216,834

(22) Filed: Dec. 11, 2018

(65) Prior Publication Data

US 2020/0183104 A1 Jun. 11, 2020

(51) Int. Cl.
*G02B 6/42* (2006.01)
*G02B 6/28* (2006.01)
*G02B 6/38* (2006.01)
*G02B 6/43* (2006.01)

(52) U.S. Cl.
CPC ......... *G02B 6/4246* (2013.01); *G02B 6/2804* (2013.01); *G02B 6/3897* (2013.01); *G02B 6/4249* (2013.01); *G02B 6/43* (2013.01)

(58) Field of Classification Search
None
See application file for complete search history.

(56) References Cited

U.S. PATENT DOCUMENTS

| 4,943,136 | A | 7/1990 | Popoff | |
| 5,005,939 | A * | 4/1991 | Arvanitakis | G02B 6/4204 257/701 |
| 6,722,789 | B1 | 4/2004 | Hyhzin et al. | |
| 6,797,879 | B2 | 9/2004 | Leyda et al. | |
| 6,873,800 | B1 * | 3/2005 | Wei | G02B 6/4204 385/14 |
| 8,045,858 | B2 | 10/2011 | Truong | |

(Continued)

OTHER PUBLICATIONS

Partial European Search Report dated Apr. 6, 2020 in European Patent Application No. 19204662.1 (European counterpart to the instant U.S. patent application).

(Continued)

*Primary Examiner* — Kenneth N Vanderpuye
(74) *Attorney, Agent, or Firm* — Ostrager Chong Flaherty & Broitman P.C.

(57) ABSTRACT

An apparatus configured to function as a pluggable active optical connector that is modular with one or more channels and that converts electrical signals to optical signals and vice versa. On one side, the apparatus has a pluggable electrical interface to a line replaceable unit (LRU); on the other side the apparatus has a pluggable optical interface side to an aircraft fiber optic wiring bundle. The apparatus is pluggable to different types of LRUs including rack-mounted and bolted-down LRUs. The apparatus includes electronic and photonic components sufficient to enable electrical/optical conversion totally within a standard-sized aircraft connector. The apparatus is adaptable to various data communication protocols and has the flexibility to be used in either a single-fiber or a dual-fiber bidirectional data link.

20 Claims, 17 Drawing Sheets

(56) References Cited

U.S. PATENT DOCUMENTS

| | | | |
|---|---|---|---|
| 8,320,766 B2 | 11/2012 | Truong et al. | |
| 8,521,032 B2 | 8/2013 | Truong | |
| 9,337,932 B2 | 5/2016 | Stapleton et al. | |
| 9,366,826 B2 | 6/2016 | Fabian et al. | |
| 9,389,373 B2 | 7/2016 | Chan et al. | |
| 9,791,644 B2 | 10/2017 | Chan et al. | |
| 9,798,087 B1 * | 10/2017 | Mathai | G02B 6/29367 |
| 2007/0116076 A1 * | 5/2007 | Wang | H01S 5/0683 |
| | | | 372/38.07 |
| 2007/0233906 A1 | 10/2007 | Tatum et al. | |
| 2008/0025676 A1 * | 1/2008 | Wang | G02B 6/4246 |
| | | | 385/92 |
| 2009/0141746 A1 * | 6/2009 | Fujikawa | H01S 3/025 |
| | | | 372/10 |
| 2010/0021174 A1 | 1/2010 | Truong | |
| 2010/0183314 A1 * | 7/2010 | Truong | H04B 10/801 |
| | | | 398/115 |
| 2016/0192044 A1 * | 6/2016 | Raza | G02B 6/3885 |
| | | | 398/49 |

OTHER PUBLICATIONS

Extended European Search Report dated Jun. 30, 2020 in European Patent Application No. 19204662.1 (European counterpart to the instant U.S. patent application).

* cited by examiner

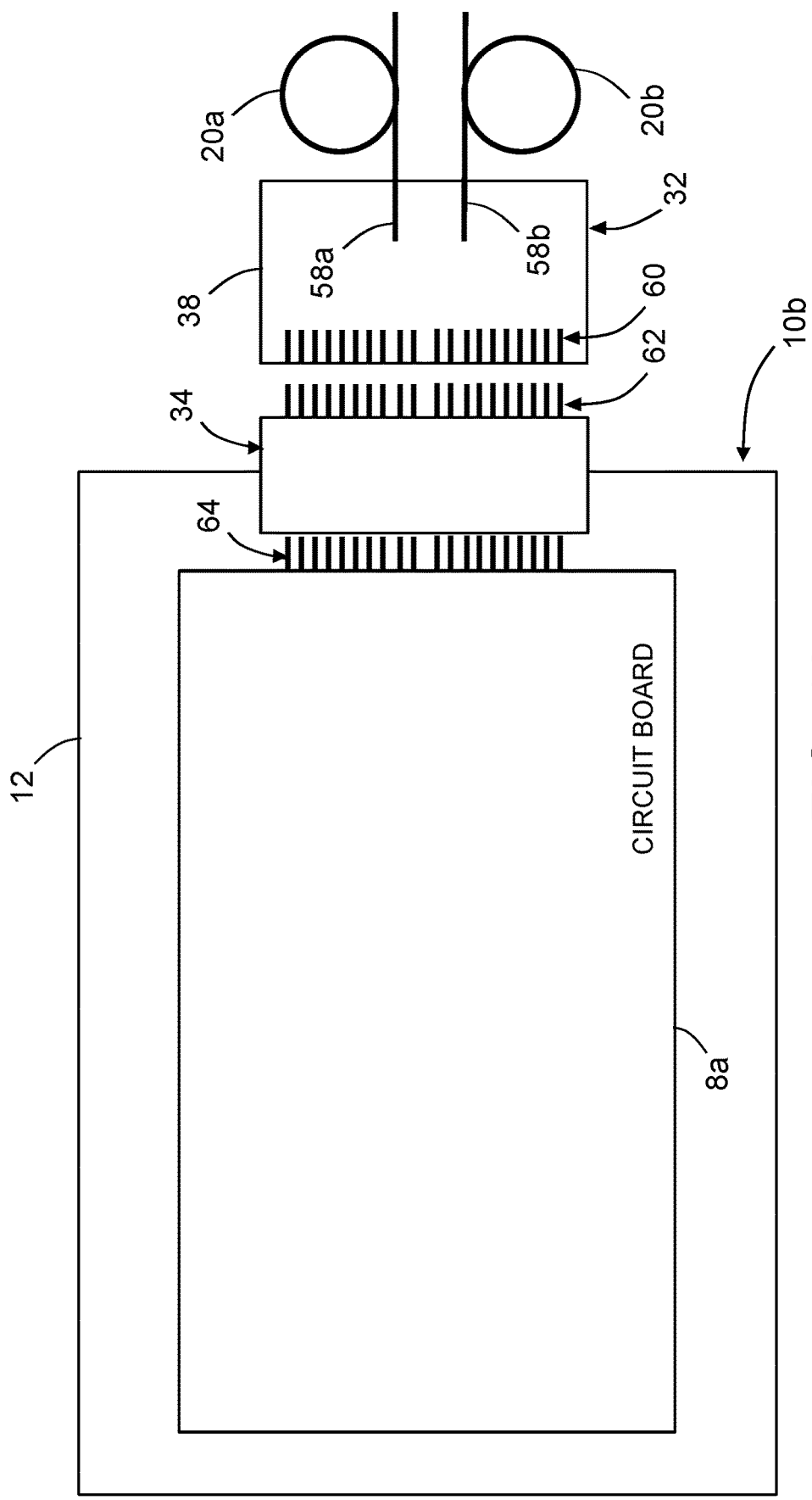

AVIONICS PLUGGABLE ACTIVE OPTICAL CONNECTOR

BACKGROUND

The technology disclosed herein generally relates to fiber optical networks that enable communication between electrical components. In particular, the technology disclosed herein relates to electrical avionics systems interconnected by an optical avionics data bus.

The use of optical fiber cables instead of electrical wiring for a high-speed avionics data network may result in significant reduction of weight, cost, electromagnetic effects, and complexity of electrical wiring integration. In modern aircraft, line replaceable units (LRUs) (such as avionics computers and sensor units) typically include a housing containing a transceiver to enable optical fiber communication with other LRUs. An optical connector on the LRU housing enables an external optical fiber cable to be connected to the LRU.

More specifically, each LRU connected to an optical avionics data bus typically includes an optical-electrical media converter) having an electro-optical transmitter and an opto-electrical receiver (hereinafter collectively referred to as a "optical-electrical bidirectional transceiver") to enable optical fiber communication with other LRUs. The electro-optical transmitter converts electrical signals into optical signals; the opto-electrical receiver converts optical signals into electrical signals. An optical connector on a housing of the LRU enables an optical fiber cable to be connected to the LRU.

The typical aircraft build process also requires production breaks (in-line connectors) between the LRU and the aircraft wiring bundle. When an existing optical-electrical LRU is removed from a rack, the optical contacts are exposed to a dust and moisture environment that required cleaning and inspection before plugging it back into the rack. For an LRU to interface to aircraft fiber optics, a supplier must acquire new capability to redesign and embed new transceivers, optical wiring, and optical connectors within the LRU. The learning curve is difficult and the cost to design, build, and certify new LRUs with optical interfaces is high. Moreover, new LRU optical design is not consistent among LRUs and suppliers since the aircraft manufacturer does not dictate what is inside the LRU but can only define the optical interface to the aircraft wiring.

The design of an electrical avionics systems interconnected by an optical avionics data bus but not afflicted with the drawbacks mentioned above would be beneficial for multifarious reasons, including eliminating the costs associated with the design and re-design of LRUs having a built-in transceiver.

SUMMARY

The subject matter disclosed in some detail below is directed to an apparatus configured to function as a pluggable active optical connector (hereinafter "PAOC") that is modular with one or more channels and that converts electrical signals to optical signals and vice versa. On one side, the PAOC has a pluggable electrical interface to a line replaceable unit (LRU); on the other side the apparatus has a pluggable optical interface to an aircraft fiber optic wiring bundle. The PAOC is pluggable to different types of LRUs including rack-mounted and bolted-down LRUs. The PAOC includes electronic and photonic components sufficient to enable electrical/optical conversion totally within an aircraft connector. In addition, the apparatus is adaptable to various data communication protocols and has the flexibility to be used in either a single-fiber or dual-fiber bidirectional data link. A pluggable active optical connector of this type eliminates the drawbacks associated with design and re-design of LRUs having built-in transceivers.

As used herein, the term "pluggable", when used as an adjective to characterize a capability of a first component, means that the component may be coupled to and later uncoupled from a second component by inserting male portions (e.g., pins or plugs) of one of the first and second components into respective female portions (e.g., receptacles or sockets) of the other of the first and second components. For example, a PAOC may have electrical pins that are inserted into electrical sockets of an LRU mating connector or the PAOC may have electrical sockets into which electrical pins of the LRU mating connector are inserted. In both instances, the PAOC is "plugged into" the LRU mating connector.

Although various embodiments of a pluggable active optical connector will be described in some detail below, one or more of those embodiments may be characterized by one or more of the following aspects.

One aspect of the subject matter disclosed in detail below is pluggable active optical connector comprising: a connector housing; a printed circuit board contained within the connector housing; a multiplicity of electrical connectors electrically coupled to and supported by the printed circuit board; a bidirectional optical sub-assembly comprising a laser device and a photodetector which are electrically coupled to the printed circuit board; a housing mounted to the printed circuit board, the housing comprising a first receptacle that is configured to contain the bidirectional optical sub-assembly and a second receptacle that is configured to receive one end of a terminus that terminates an optical cable. The first laser device is electrically coupled to a first pair of electrical connectors of the first multiplicity of electrical connectors and arranged to transmit light through the housing to an end of the first optical fiber in response to electrical signals received via the first pair of electrical connectors of the first multiplicity of electrical connectors. The first photodetector is electrically coupled to a second pair of electrical connectors of the first multiplicity of electrical connectors and arranged to send electrical signals to the second pair of electrical connectors of the first multiplicity of electrical connectors in response to receipt of light from the end of the first optical fiber.

Another aspect of the subject matter disclosed in detail below is a data transmission system comprising: a fiber optical network; a plurality of electronic devices; a plurality of mating connectors which are respectively attached and electrically coupled to the plurality of electronic devices, each mating connector having a multiplicity of electrical connectors; and a plurality of pluggable active optical connectors which are respectively attached and electrically coupled to the plurality of mating connectors and optically coupled to the fiber optical network, wherein each of the plurality of pluggable active optical connectors comprises a respective optical-electrical bidirectional transceiver and a multiplicity of electrical connectors respectively electrically coupled to the electrical connectors of a respective mating connector. In accordance with one proposed implementation, the electronic devices are line replaceable units installed on an aircraft.

A further aspect of the subject matter disclosed in detail below is a method for assembling an avionics data transmission system, the method comprising: (a) connecting a first multiplicity of electrical connectors to circuitry on a printed circuit board; (b) connecting a laser device and a photodetector of an optical sub-assembly of an optical-electrical bidirectional transceiver to the circuitry on the printed circuit board; (c) placing an end of an optical fiber cable of a fiber optical network onboard an aircraft in a position confronting the optical sub-assembly of the optical-electrical bidirectional transceiver; and (d) connecting the first multiplicity of electrical connectors to a second multiplicity of electrical connectors of a mating connector attached to a line replaceable unit onboard the aircraft.

In accordance with one embodiment of the method described in the immediately preceding paragraph, step (c) comprises: terminating the end of the optical fiber cable in a terminus; and inserting the terminus inside of a housing mounted to the printed circuit board until an end face of the optical fiber cable is within a specified distance and optically coupled to the optical sub-assembly of the optical-electrical bidirectional transceiver. In addition, step (d) comprises: aligning the first multiplicity of electrical connectors with the second multiplicity of electrical connectors; and moving the printed circuit board toward the line replaceable unit while maintaining the first and second multiplicities of electrical connectors in alignment.

Other aspects of pluggable active optical connectors are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIG. 18 is a diagram representing an electrical LRU that is able to receive data from and send data to optical fiber cables of an optical avionics data bus when an LRU-side connector and an aircraft-side pluggable active optical connector having pigtails epoxied thereto in accordance with a further alternative embodiment are mated. (The connectors are shown in an unmated state in FIG. 18.)

Reference will hereinafter be made to the drawings in which similar elements in different drawings bear the same reference numerals.

DETAILED DESCRIPTION

Illustrative embodiments of pluggable active optical connectors are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Various embodiments of a fiber optical network for enabling optical communication between line replaceable units on an aircraft will be described in detail below for the purpose of illustration. However, implementation of the fiber optical networks disclosed herein is not limited solely to the environment of an aircraft, but rather may be utilized in fiber optical networks onboard other types of vehicles or other types of fiber optical networks (e.g., long-distance terrestrial, data center and fiber-to-the-home/office applications).

Fiber optical networks have the advantages of higher speed, lower weight and electromagnetic interference immunity over copper wire networks. Many models of commercial aircrafts have fiber optical networks for size, weight and power reduction. It is common practice to connect a number of line replaceable units (LRUs) to each other to achieve communication within an avionics system. For example, a number of LRUs in the forward section of a vehicle (e.g., an aircraft) have been connected to a number of LRUs in the aft section of the vehicle via an avionics data bus.

Figure 1:
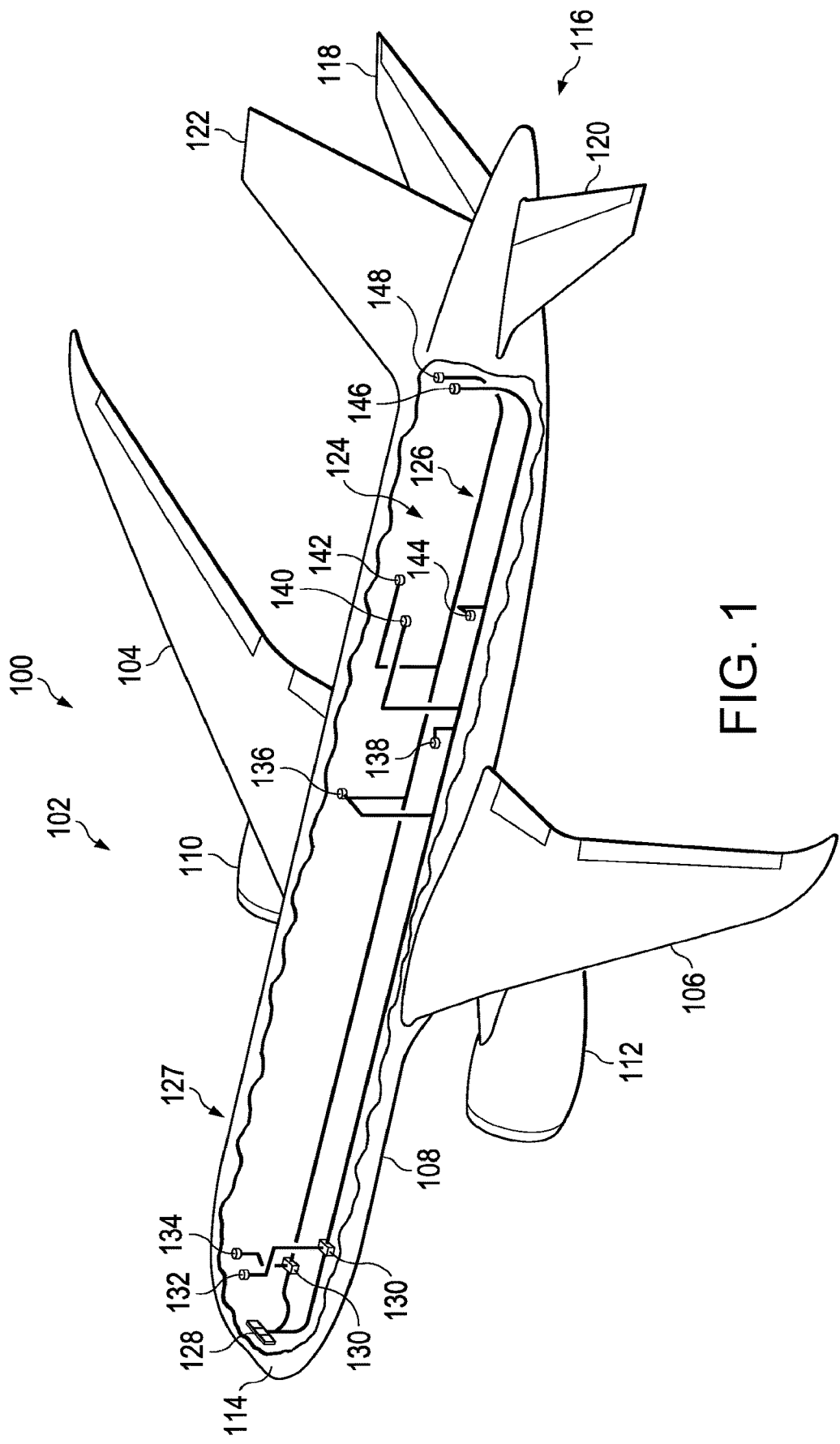
FIG. 1 is a diagram representing a three-dimensional cutaway view of a data processing system onboard an aircraft, the data processing system including an optical data communication network.

FIG. 1 illustrates a network environment 100 comprising an aircraft 102. An aircraft 102 is an example of a platform in which the connectors disclosed herein may be used. In the example depicted in FIG. 1, the aircraft 102 has right wing 104 and a left wing 106 attached to a fuselage 108. Aircraft 102 also includes an engine 110 attached to the right wing 104 and an engine 112 attached to the left wing 106. Aircraft 102 also has a nose section 114 and a tail section 116. The tail section 116 includes a right horizontal stabilizer 118, a left horizontal stabilizer 120, and a vertical stabilizer 122.

The aircraft 102 depicted in FIG. 1 further includes an onboard data communication and processing system 124 comprising a fiber optical network 126 and a plurality of devices 127, such as flight deck displays 128, flight control computers 130, and other components, which are connected (and optically coupled) to the fiber optical network 126. Other types of devices 127 may take the form of LRUs 132, 134, 136, 138, 140, 142, 144, 146, and 148. These LRUs may take various forms. For example, the LRUs may be a computer, a sensor, an in-flight entertainment system, and other suitable types of devices. The devices 127 use electrical signals internally, so the optical signals transmitted over fiber optical network 126 are typically converted into electrical signals through the use of optical-electrical media converters (not shown in FIG. 1). These optical-electrical media converters (hereinafter "optical-electrical bidirectional transceivers") may be internal or external to the LRU.

In the case of an LRU having one or more optical-electrical transceivers incorporated inside the LRU housing (hereinafter "optical-electrical LRU"), the optical-electrical LRU may be mounted to a rack onboard an aircraft by means of a mechanical assembly that provides support and self-indexing for the LRU. Each optical-electrical LRU contains an internal optical-electrical bidirectional transceiver that is optically coupled to an optical avionics data bus of the fiber optical network 126 by means of a mating connector that is mechanically coupled to the LRU housing. The mating connector provides the optical connection to aircraft systems and structural support for the LRU.

Figure 2:
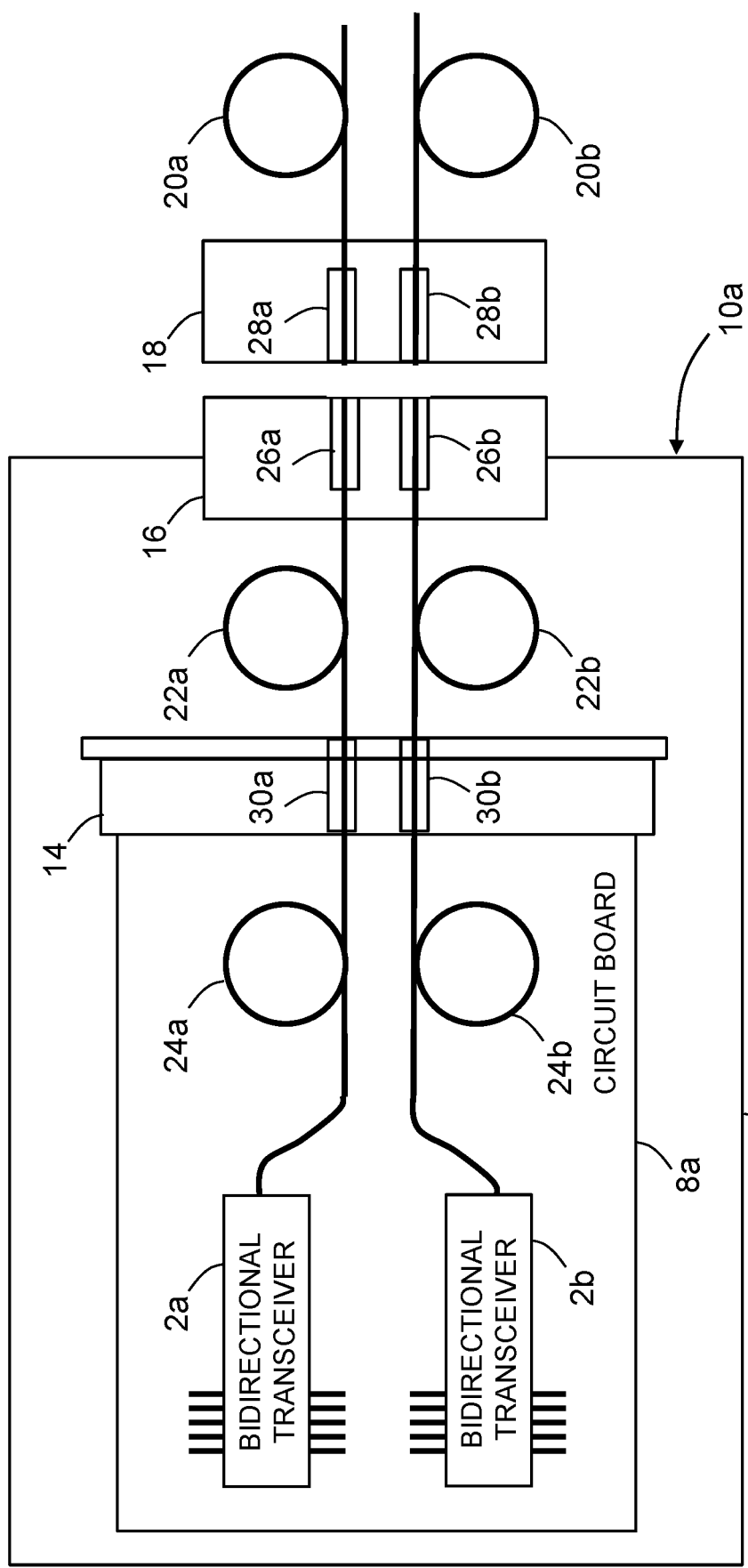
FIG. 2 is a diagram representing a typical optical-electrical LRU having internal transceivers which may be optically coupled to optical fiber cables of an optical avionics data bus when an LRU-side connector and an aircraft-side connector are mated. (The connectors are shown in an unmated state in FIG. 2.)

FIG. 2 is a diagram representing a typical optical-electrical LRU 10a having an LRU housing 12, a backplane connector 14 mechanically coupled to and contained within the LRU housing 12, a printed circuit board 8a mechanically coupled to an optical backplane connector 14, and an LRU mating optical connector 16 mechanically coupled to the LRU housing 12. In the example depicted in FIG. 2, the LRU mating optical connector 16 has a pair of termini 26a and 26b which terminate the respective ends of optical fiber cables 22a and 22b disposed inside the LRU housing 12 and on one side of the backplane connector 14. The other ends of optical fiber cables 22a and 22b are optically coupled to respective ends of optical fiber cables 24a and 24b inside the LRU housing 12 and on the other side of the backplane connector 14 by means of respective optical connectors 30a and 30b. The optical connectors 30a and 30b are affixed to the backplane connector 14.

The optical-electrical LRU 10a depicted in FIG. 2 further includes a pair of optical-electrical bidirectional transceivers 2a and 2b (two to provide redundancy) mounted and electrically coupled to the printed circuit board 8a. Each of the optical-electrical bidirectional transceivers 2a and 2b includes an electro-optical transmitter and an opto-electrical receiver (not shown in FIG. 2). The optical-electrical bidirectional transceiver 2a is optically coupled to the other end of optical fiber cable 24a; the optical-electrical bidirectional transceiver 2b is optically coupled to the other end of optical fiber cable 24b.

FIG. 2 further depicts an aircraft harness optical connector 18 that has a pair of termini 28a and 28b which terminate the respective ends of optical fiber cables 20a and 20b of an fiber optical network at positions external to the optical-electrical LRU 10a. When the LRU mating optical connector 16 and aircraft harness optical connector 18 are mated, the optical fiber cables 20a and 20b external to the optical-electrical LRU 10a are respectively optically coupled to the optical-electrical bidirectional transceivers 2a and 2b inside the optical-electrical LRU 10a.

In accordance with the configuration depicted in FIG. 2, the optical-electrical bidirectional transceivers 2a and 2b are mounted on the printed circuit board 8a and the associated optical fiber cables and optical connectors disposed within each LRU are variously customized by different suppliers. Such a configuration also requires fiber management devices to control bend radius and optical connectors at the LRU interface.

Figure 3:
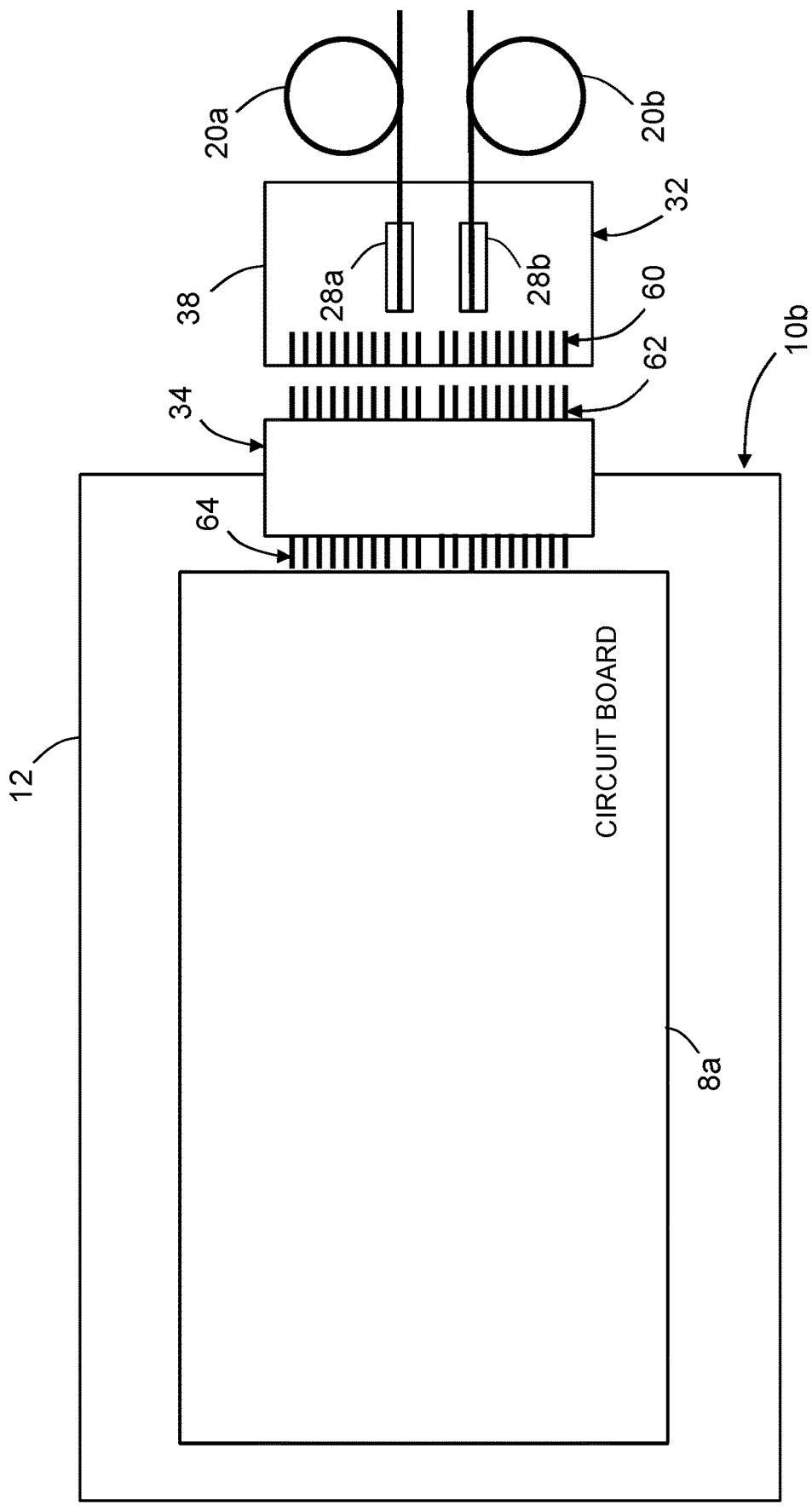
FIG. 3 is a diagram representing an electrical LRU that is able, via the PAOC, to receive data from and send data to optical fiber cables of an optical avionics data bus when an LRU-side connector and an aircraft-side pluggable active optical connector in accordance with one embodiment are mated. (The connectors are shown in an unmated state in FIG. 3.)

In contrast to the optical-electrical LRU 10a depicted in FIG. 2, FIG. 3 shows an electrical LRU 10b (having no internal optical-electrical transceivers) which is optically coupled to optical fiber cables 20a and 20b by means of a pluggable active optical connector 32 which is external to the electrical LRU 10b. As used herein, the term "active" signifies that the optical connector has optoelectronic components (e.g., an optical-electrical bidirectional transceiver). The pluggable active optical connector (PAOC) disclosed herein is designed for use with electrical LRUs which do not have internal optical-electrical transceivers.

The electrical LRU 10b depicted in FIG. 3 has an LRU housing 12, a printed circuit board 8a mounted inside the LRU housing 12, and an LRU mating electrical connector 34 mechanically coupled to the LRU housing 12. In the example depicted in FIG. 3, the LRU mating electrical connector 34 is an electrical interface having a multiplicity of electrical pins 62 on a wire bundle side and electrical wires 64 on an LRU side. There is a one-to-one correspondence of electrical pins 62 to electrical wires 64. Each electrical pin 62 is electrically conductively connected to a respective electrical wire 64 to form a multiplicity of parallel electrical conductors that carry electrical signals representing information received from or transmitted to other LRUs via the fiber optical network.

FIG. 3 further depicts a pluggable active optical connector 32 that has a pair of termini 28a and 28b which terminate the respective ends of optical fiber cables 20a and 20b of a wire bundle assembly at positions external to the electrical LRU 10b. The pluggable active optical connector 32 includes a connector housing 38 having a multiplicity of electrical sockets 60 on an LRU side for receiving the multiplicity of electrical pins 62 when the LRU mating electrical connector 34 and pluggable active optical connector 32 are mated. The pluggable active optical connector 32 further includes a pair of bidirectional optical-electrical transceivers (not shown in FIG. 3, but which may each have the structure depicted in FIG. 4). When the LRU mating electrical connector 34 and pluggable active optical connector 32 are mated (FIG. 3 shows these components unmated), electrical LRU 10b is electrically coupled to the optical-electrical bidirectional transceivers incorporated in the pluggable active optical connector 32 via the electrical sockets 60 and a printed circuit board (not shown in FIG. 3).

Figure 4:
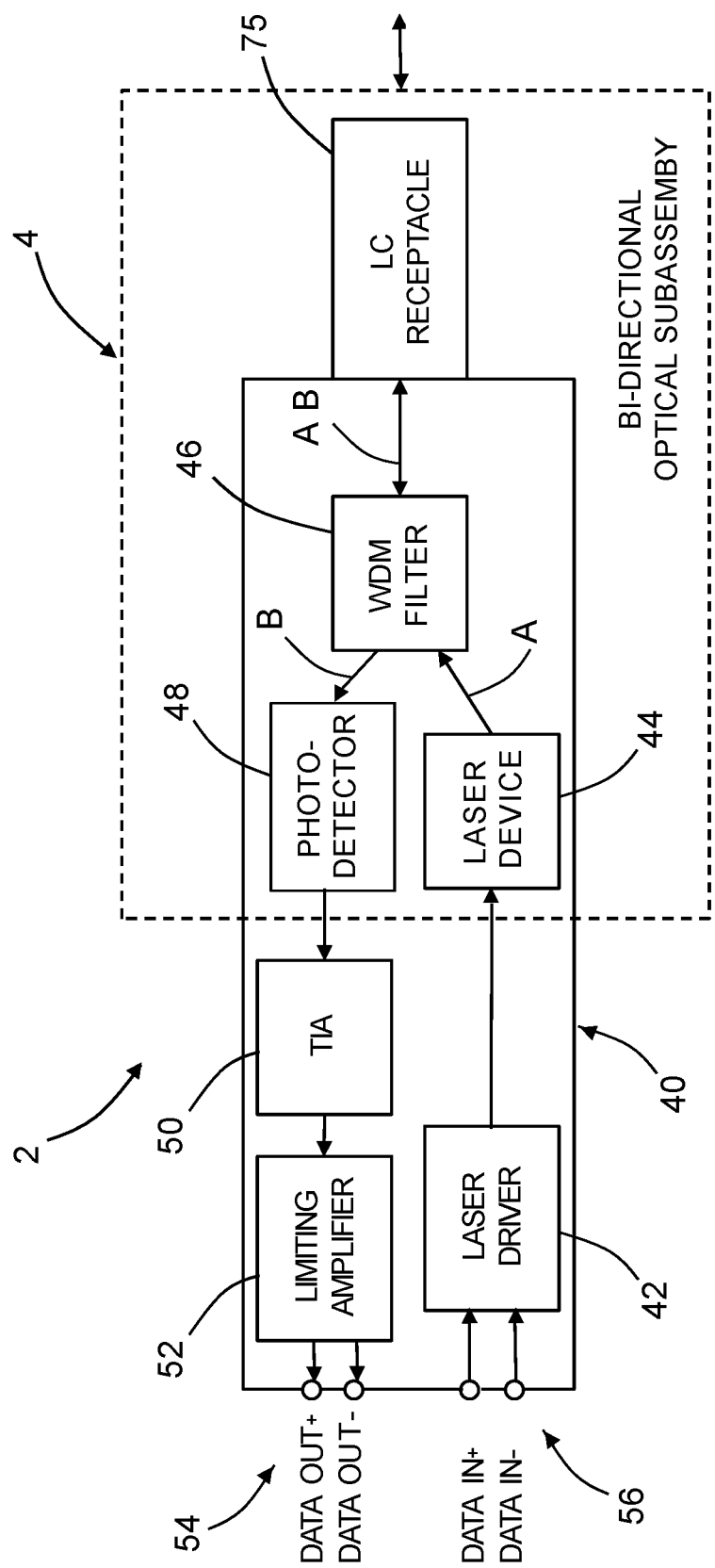
FIG. 4 is a block diagram identifying some components of an optical-electrical bidirectional transceiver in accordance with one proposed implementation.

FIG. 4 is a block diagram identifying some components of an optical-electrical bidirectional transceiver 2 in accordance with one proposed implementation. The optical-electrical bidirectional transceiver 2 has a single-fiber full-duplex bidirectional transceiver design in which the optical-electrical bidirectional transceiver 2 transmits light having a first wavelength λ1 and receives light having a second wavelength λ2 different than the first wavelength λ1 via the same optical fiber cable 28 (not shown in FIG. 4, but see optical fiber 20a or 20b in FIG. 8). The optical-electrical bidirectional transceiver 2 includes a bidirectional optical sub-assembly 4 (hereinafter "OSA 4") mounted to a printed circuit board 40. The printed circuit board 40 further has various electrical components mounted thereon and printed circuits which connect the electrical components to each other and to terminals.

The dual-wavelength single-fiber optical-electrical bidirectional transceiver 2 depicted in FIG. 4 includes a laser device 44 and a photodetector 48. The laser device 44 is driven to emit light of a wavelength λ1 by a laser driver 42 in response to receipt at data input terminals 56 of differential transmit signals from an associated line replaceable unit (not shown) via transmit electrical signal lines (not shown in FIG. 4). [As used herein, the term "wavelength" in the context of coherent laser light means the center wavelength of laser light having a narrow spectral width.] The laser driver 42 comprises electrical circuitry that converts those electrical differential signals to electrical digital signals representing the data to be transmitted by the laser device 44. Conversely, the photodetector 48 receives light of wavelength λ2 and converts that detected light into electrical signals which are provided to a receive circuit including a transimpedance amplifier 50 that amplifies the detector signal and a limiting amplifier 52 that performs the digitization of the output signal. The receive circuit converts those electrical signals to digital electrical differential receive signals representing the data received. The electrical differential receive signals are transmitted to other circuitry in the line replaceable unit via data output terminals 54 and receive electrical signal lines not shown in FIG. 4.

In the example depicted in FIG. 4, the bidirectional transceiver 2 includes a laser device 44 and a photodetector 48. The laser device 44 may be implemented with a single-mode distributed feedback laser, a multi-mode Fabry-Pérot lasers or a vertical cavity surface-emitting laser for high optical output power and low modal noise. The photodetector 48 may be implemented with a high-responsivity p-type intrinsic n-type (PIN) photodiode or an avalanche photodiode to provide high receiver sensitivity. The bidirectional transceiver 2 depicted in FIG. 4 further includes an LC receptacle sized and configured to receive the termination of an optical fiber (not shown in FIG. 4, but see optical fiber 20a or 20b in FIG. 8).

The optical-electrical bidirectional transceiver 2 depicted in FIG. 4 is capable of single-fiber operation because it is equipped in its optical front end with a wavelength-division multiplexing (WDM) filter 46 (hereinafter "WDM filter 46") which passes the optical signal from the laser device 44 at one wavelength λ1 and reflects the received optical signal at a different wavelength λ2 toward the photodetector 48. The WDM filter 46 inside of the optical-electrical bidirectional transceiver 2 is a wavelength-selective bandpass filter designed in accordance with a high cross-talk isolation technique. Use of such isolation ensures that the optical signal A from the local laser device 44 is not detected by the photodetector 48 in the same bidirectional transceiver and that the optical signal B detected by the photodetector 48 is not received by the laser device 44.

The optical-electrical bidirectional transceiver 2 depicted in FIG. 4 further includes an optical sub-assembly 4 that is mounted to the printed circuit board 40. The optical sub-assembly 4 has a housing (hereinafter "OSA housing") that consists of two integrally formed receptacles, including a LC receptacle 75 that receives a terminated optical fiber and a second receptacle that contains the optical components to be optically coupled to the terminated optical fiber.

Figure 5:
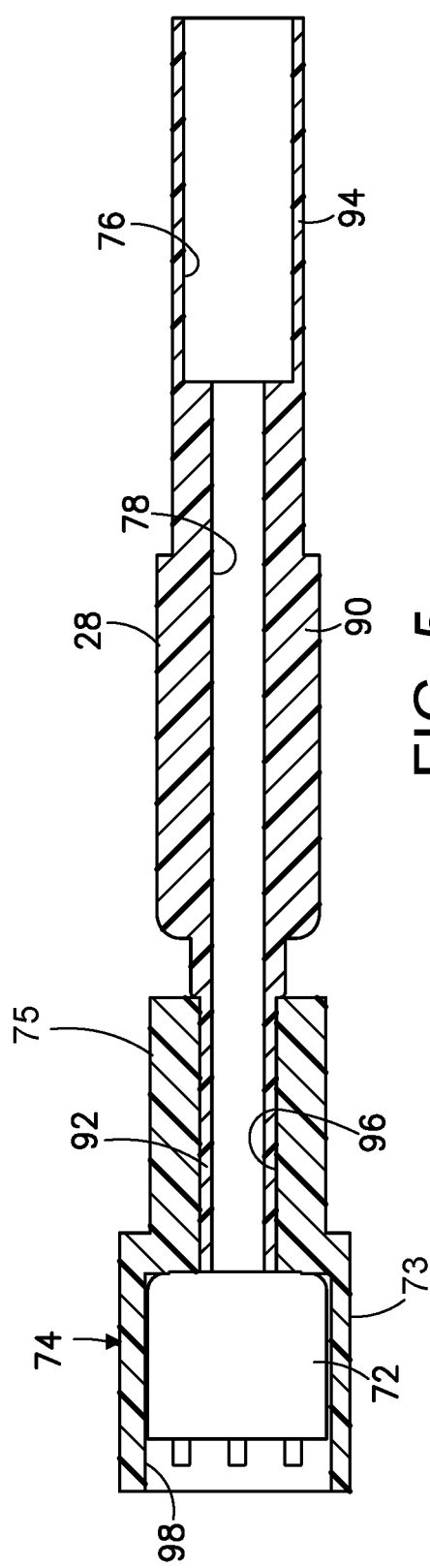
FIG. 5 is a diagram representing a sectional view of a terminus/receptacle assembly in accordance with one embodiment.

As seen in FIG. 5, the OSA housing 74 includes an LC receptacle 75 with a first circular cylindrical passageway 96 sized to receive a first end section 92 of a terminus 28 and an optical component receptacle 73 with a second circular cylindrical passageway 98 (having a diameter greater than the diameter of the first circular cylindrical passageway 96). The optical components receptacle 73 of the OSA housing 74 is sized to receive a transmit/receive transistor outline (TO) can 72 that houses the laser device 44, WDM filter 46 and photodetector 48. The LC receptacle 75 and the optical components receptacle 73 may be integrally formed or rigidly affixed to each other.

Figure 6:
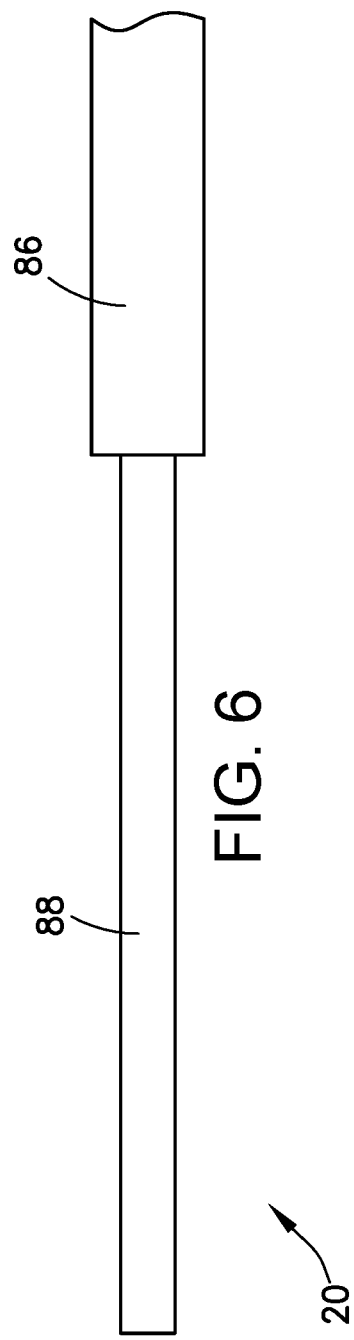
FIG. 6 is a diagram representing a side view of a portion of an optical fiber cable that may be inserted into the terminus depicted in FIG. 5 for the purpose of optically coupling an optical fiber to a transmit/receive TO can.

The terminus 28 further comprises a main body 90 and a second end section 94. The second end section 94 of the terminus 28 has a circular cylindrical cable passageway 76 that receives a jacketed portion 86 of the optical fiber cable 20 depicted in FIG. 6. The main body 90 and first end section 92 of the terminus 28 have a common circular cylindrical fiber passageway 78 that receives an unjacketed portion of the optical fiber 88 of the optical fiber cable 20. Thus if the portions of the optical fiber cable 20 shown in FIG. 6 were inserted into the terminus 28 shown in cross section in FIG. 5, the end face of the optical fiber 88 would be aligned with and confronting a lens installed in a window (not shown in FIG. 5) formed in the transmit/receive TO can 72. This physical arrangement optically couples the laser device 44 and photodetector 48 (see FIG. 4) to the optical fiber 88 (see FIG. 6). The OSA housing 74 is made of metallic material (e.g., stainless steel). Terminus 28 may be made of semi-rigid thermoplastic material or metallic material (e.g., stainless steel). One commercially available optical fiber cable 20 includes an optical fiber 88 comprising a polymer core and fluorinated polymer cladding and a jacket 86 made of polyethylene.

Figure 7:
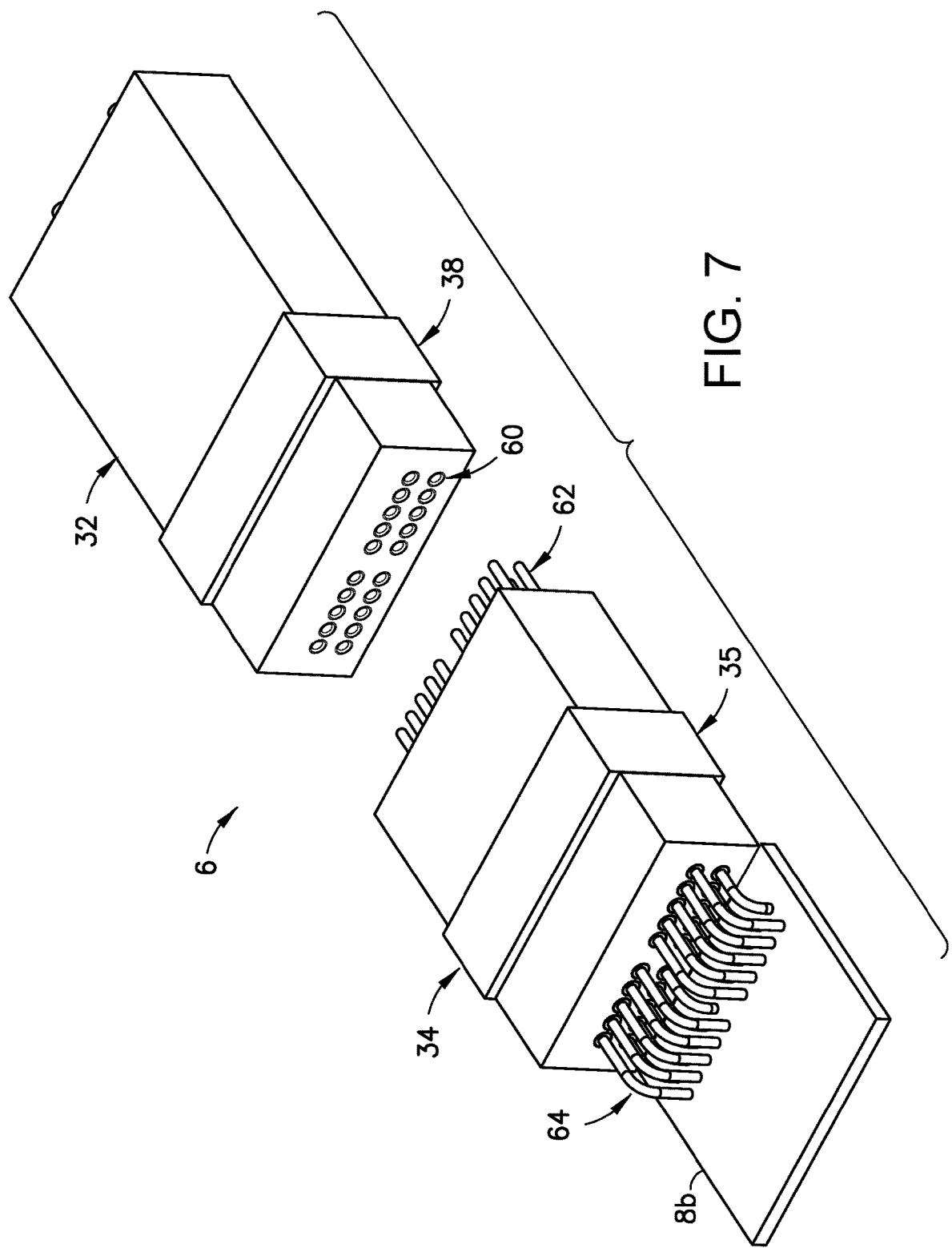
FIGS. 7 and 8 are diagrams representing respective three-dimensional views of an LRU mating connector and a pluggable active optical connector which are aligned but not yet mated.
Figure 8:
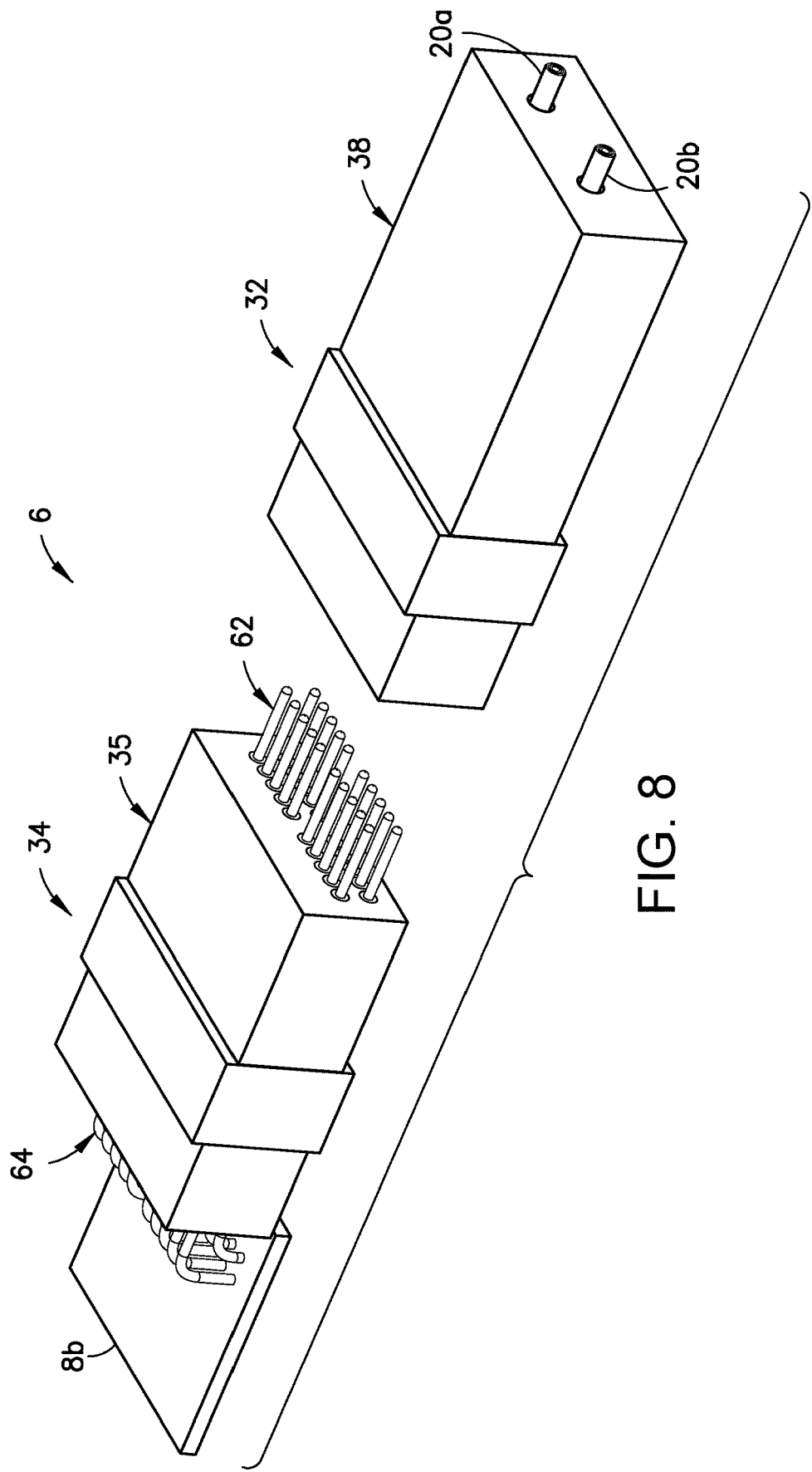
Figure 9A:
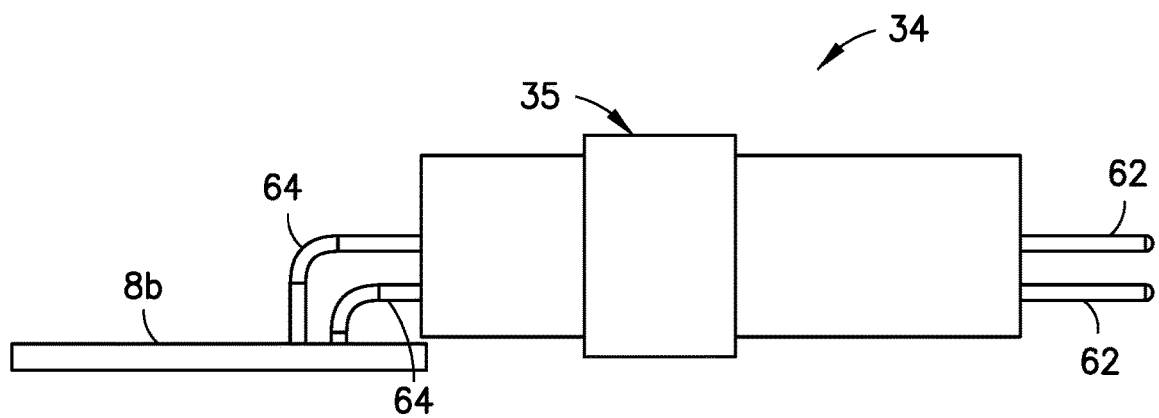
FIG. 9A is a diagram representing a side view of the LRU mating connector depicted in FIGS. 7 and 8.
Figure 9B:
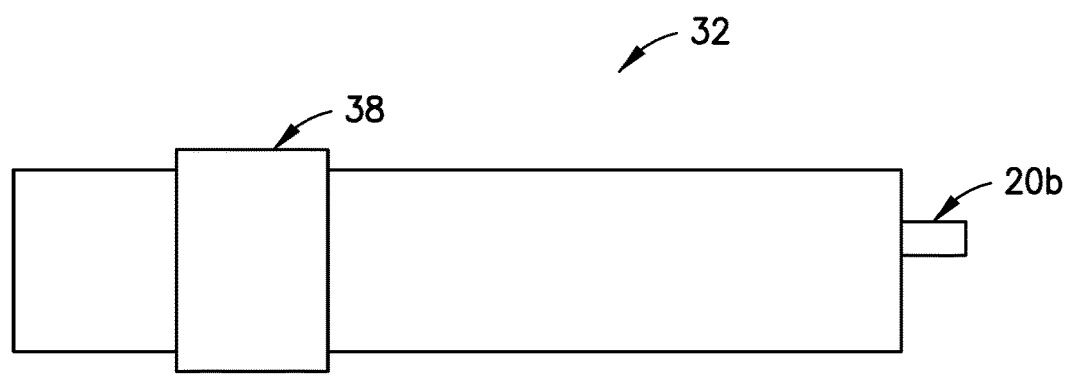
FIG. 9B is a diagram representing a side view of the pluggable active optical connector depicted in FIGS. 7 and 8.

FIGS. 7 and 8 are diagrams representing respective three-dimensional views of a connector system 6 for connecting a fiber optical network to an electrical LRU in accordance with one embodiment. The connector system 6 includes an LRU mating connector 34 and a pluggable active optical connector 32, which are shown in FIGS. 7 and 8 aligned but not yet mated. FIG. 9A is a diagram representing a side view of the LRU mating connector 34; FIG. 9B is a diagram representing a side view of the pluggable active optical connector 32. As seen in FIGS. 7, 8, 9A and 9B, the LRU mating connector 34 includes a housing 35 and the pluggable active optical connector 32 includes a connector housing 38. The housings 35 and 38 are sized and shaped to conform to requirements set forth in the existing aircraft standard ARINC 801. (The ARINC 801 specification covers the dimensions, performance, and quality assurance criteria for fiber optic interconnect components and test procedures for fiber interconnect assemblies suitable for use on commercial aircraft.) Each of the housings 35 and 38 has openings into which the optical fibers may be plugged.

In addition, the housings 35 and 38 have respective sets of openings for passage therethrough of various electrical interface components. As best seen in FIG. 7, the LRU mating connector 34 includes a multiplicity of external electrical wires 64 on the LRU side of the LRU mating connector 34. The electrical wires 64 are electrically connected to the input/output printed circuit board 8b of the LRU mating connector 34. As best seen in FIG. 8, the LRU mating connector 34 further includes a multiplicity of electrical pins 62 on the aircraft side of the LRU mating connector 34. The electrical pins 62 are configured to be electrically coupled to (e.g., plugged into) a corresponding multiplicity of electrical sockets 60 (shown in FIG. 7) incorporated in the pluggable active optical connector 32. The connector housing 38 of the pluggable active optical connector 32 has a multiplicity of openings on the LRU side which are aligned with the electrical sockets 60 and a pair of openings on the aircraft side which allow passage of respective optical fiber cables 20a and 20b of a fiber optical network. The LRU mating connector 34 and pluggable active optical connector 32 may be electrically coupled by inserting the multiplicity of electrical pins 62 into the corresponding multiplicity of electrical sockets 60.

Figure 10A:
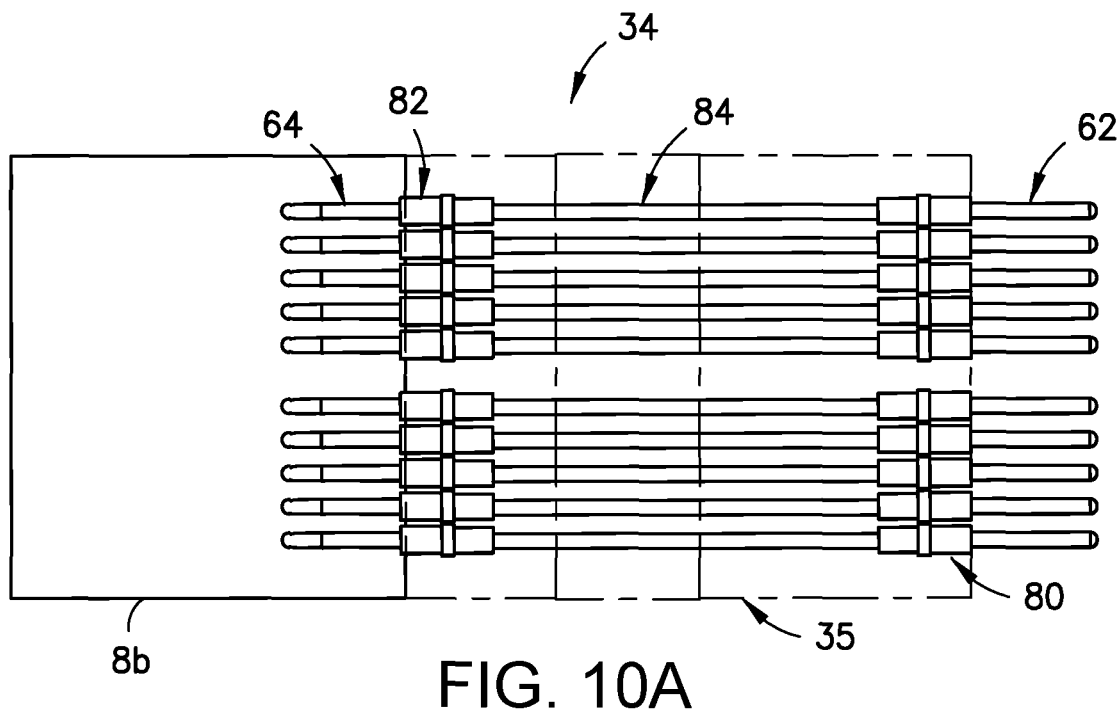
FIGS. 10A and 11A are diagrams representing top and side views respectively of the LRU mating connector depicted in FIG. 9A with the housing (indicated by dashed lines) removed.
Figure 11A:
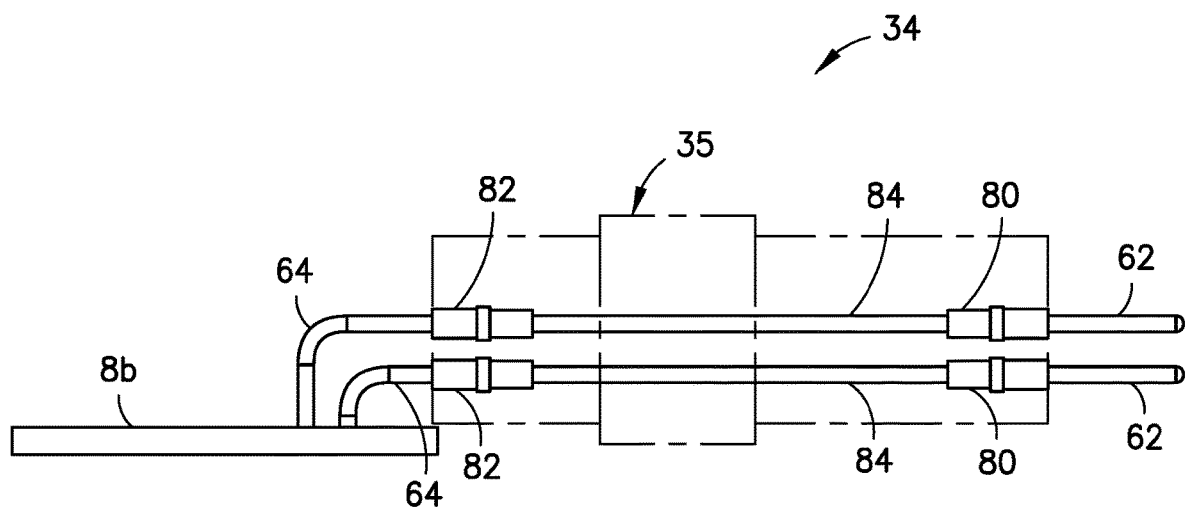
Figure 12A:
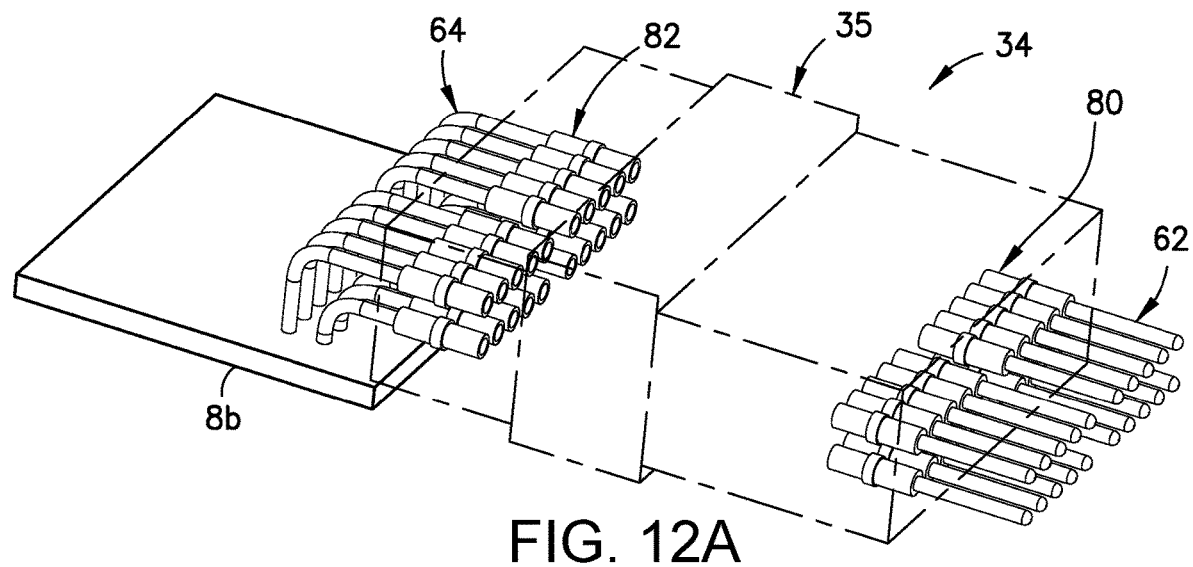
FIG. 12A is a diagram representing a three-dimensional view of electrical interfaces of the LRU mating connector depicted in FIG. 9A with the housing (indicated by dashed lines) removed. The wires which connect the electrical interfaces are also not shown.

FIGS. 10A and 11A are diagrams representing top and side views respectively of the LRU mating connector depicted in FIG. 9A with the housing (indicated by dashed lines) removed. As seen in FIGS. 10A and 11A, each electrical wire 64 is electrically connected to a corresponding electrical pin 62 by a respective first electrical connector 82, a respective electrical wire 84 and a respective second electrical connector 80. Each first electrical connector 82 connects one end of a respective electrical wire 84 to a respective electrical wire 64; each second electrical connector 80 connects the other end of the respective electrical wire 84 to a respective electrical pin 62. FIG. 12A is a diagram representing a three-dimensional view of the electrical interfaces of the LRU mating connector 34 with the housing 35 (indicated by dashed lines) removed. The electrical wires 84 which connect the electrical interfaces are also not shown.

Figure 10B:
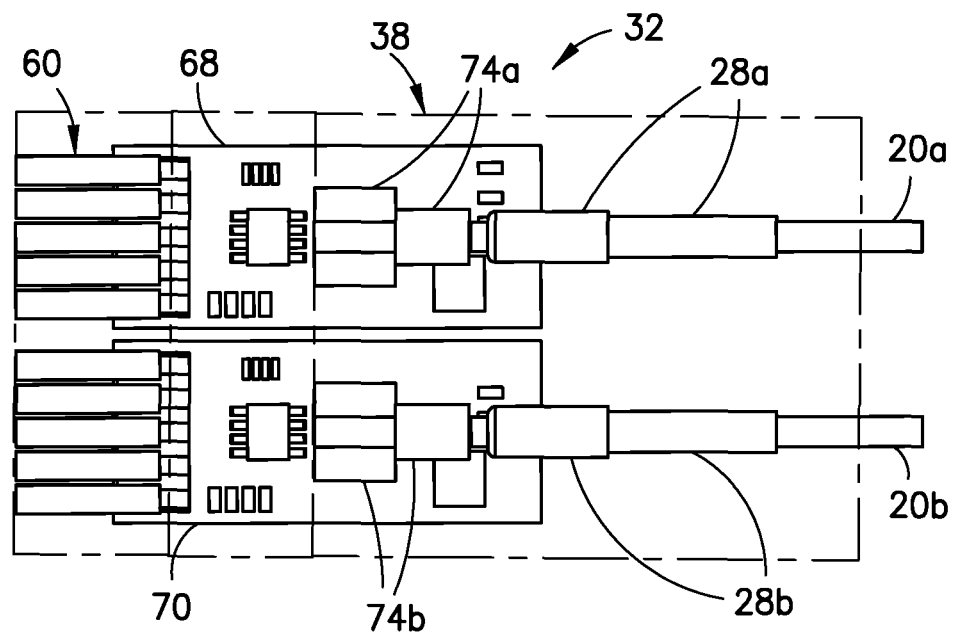
FIGS. 10B and 11B are diagrams representing top and side views respectively of the pluggable active optical connector depicted in FIG. 9B with the connector housing (indicated by dashed lines) removed.
Figure 11B:
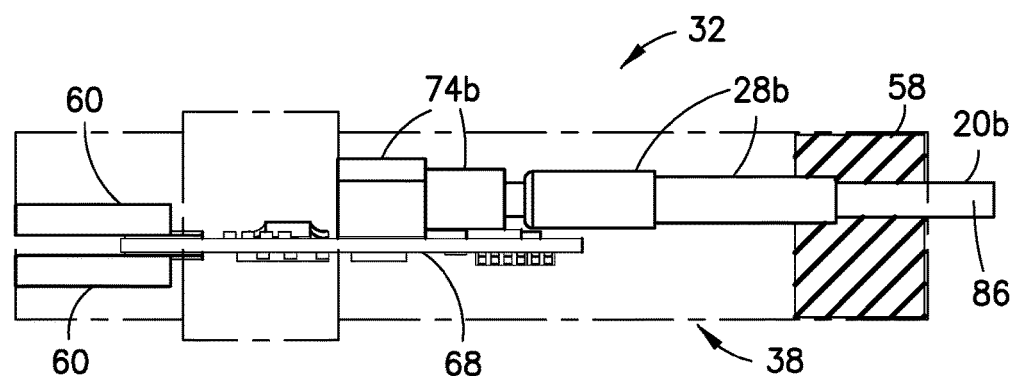
Figure 12B:
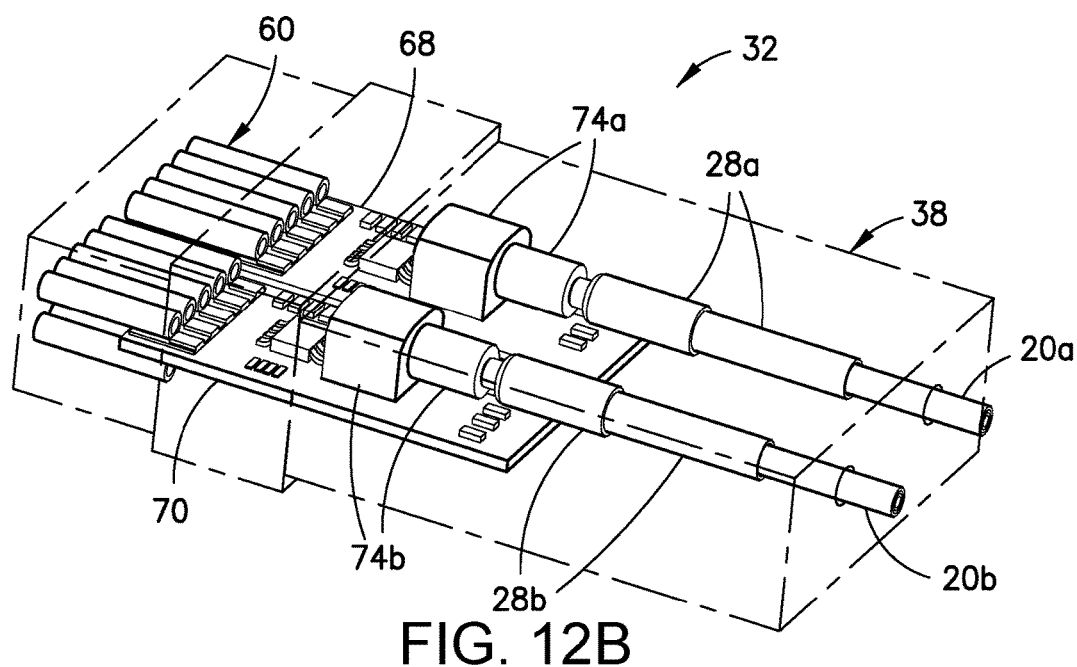
FIG. 12B is a diagram representing a three-dimensional view of assembled internal components of the pluggable active optical connector depicted in FIG. 9B with the connector housing (indicated by dashed lines) removed.
Figure 13:
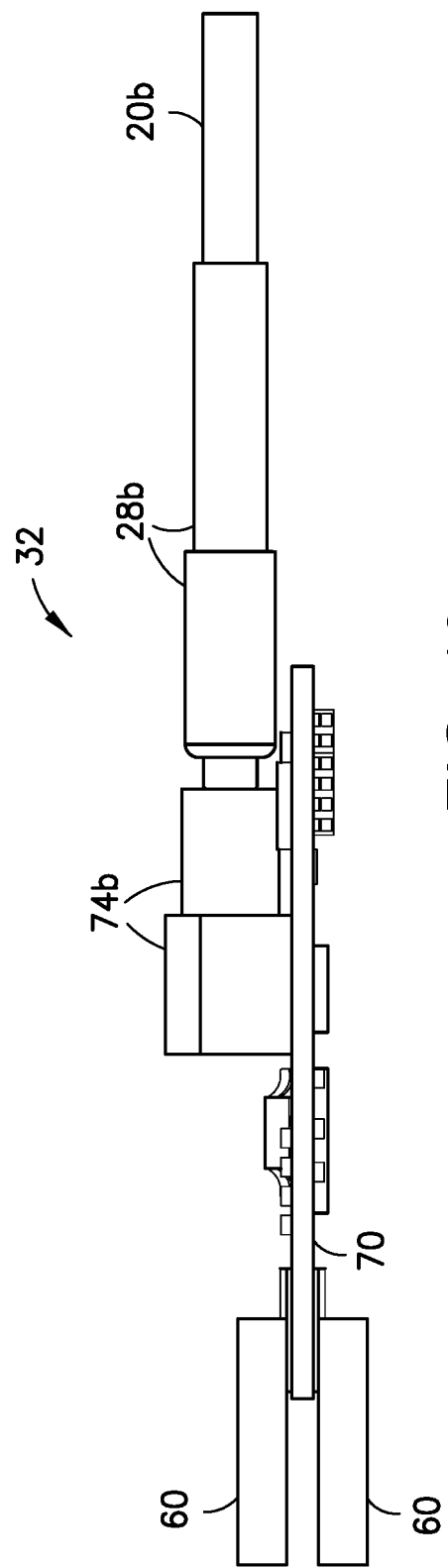
FIG. 13 is a diagram representing a side view of the assembled internal components of the pluggable active optical connector depicted in FIG. 12B.
Figure 14:
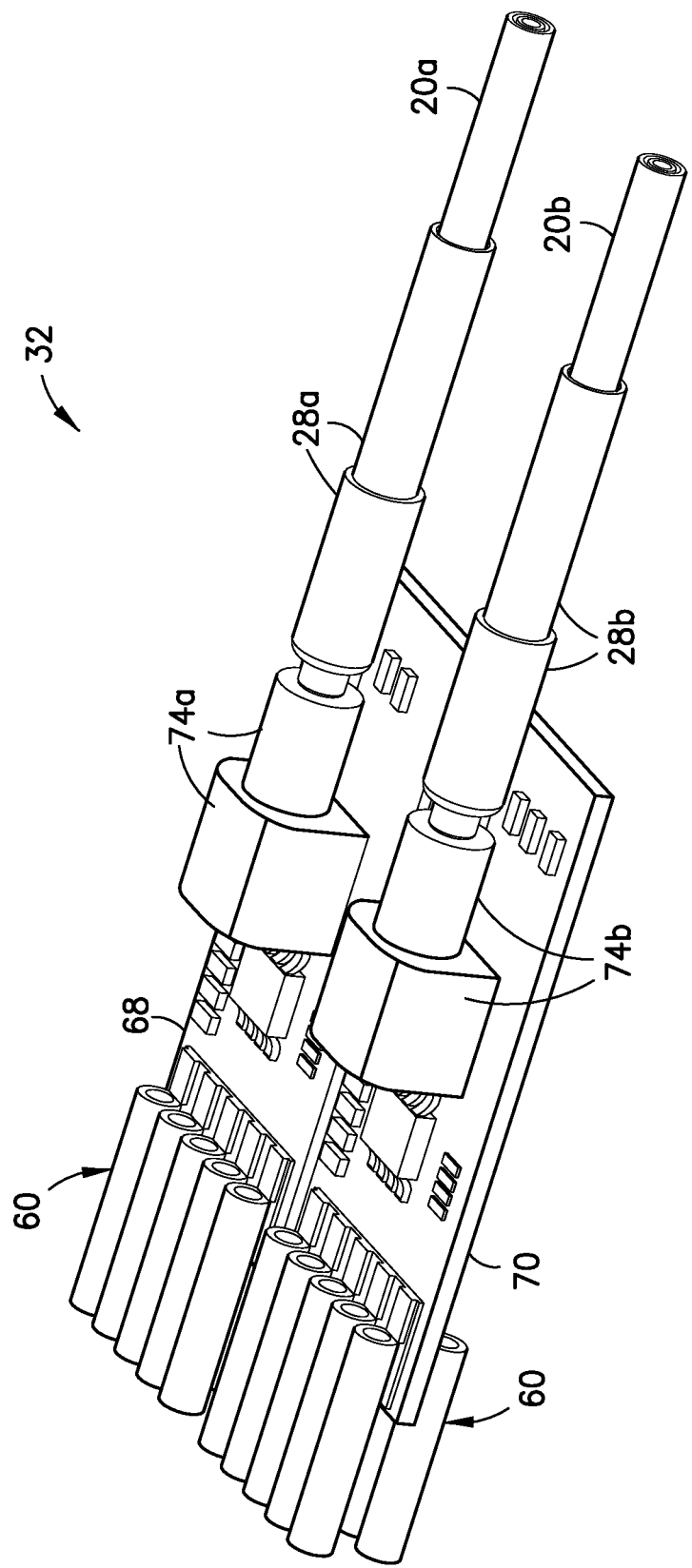
FIGS. 14 and 15 are diagrams representing respective three-dimensional views of the assembled internal components of the pluggable active optical connector depicted in FIG. 12B.
Figure 15:
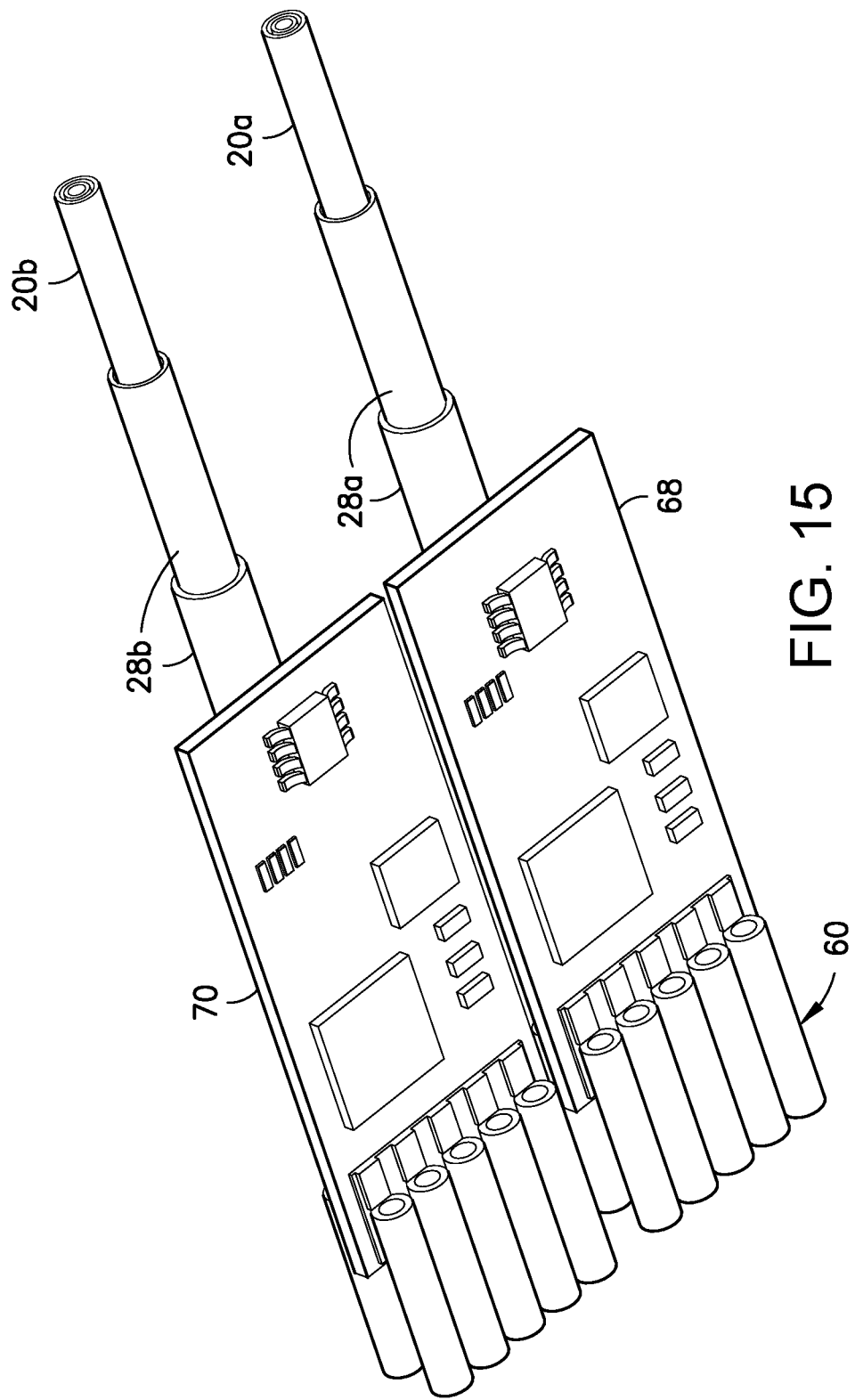

FIGS. 10B, 11B and 12B are diagrams representing top, side and three-dimensional views respectively showing the assembled internal components of the pluggable active optical connector 32 depicted in FIG. 9B with the connector housing (indicated by dashed lines) removed. The internal components of the pluggable active optical connector 32 include a pair of printed circuit boards 68 and 70 which communicate electronically with the LRU via the electrical sockets 60. The internal components of the pluggable active optical connector 32 further include a first OSA housing 74a mounted to printed circuit board 68 and a second OSA housing 74b mounted to printed circuit board 70. Each of the first and second OSA housings 74a and 74b may have the same structure as the OSA housing 74 depicted in FIG. 5. The internal components of the pluggable active optical connector 32 further include a first terminus 28a that terminates a first optical fiber cable 20a and a second terminus 28b that terminates a second optical fiber cable 20b. Each of the first and second termini 28a and 28b may have the same structure as the terminus 28 depicted in FIG. 5. When the distal end of the terminus 28a is inserted into the OSA housing 74a, the optical fiber cable 20a is optically coupled to the optical components inside the transmit/receive TO can 72 (see FIG. 5) contained within the OSA housing 74a. Similarly, when the distal end of the terminus 28b is inserted into the OSA housing 74b, the optical fiber cable 20b is optically coupled to the optical components inside the transmit/receive TO can 72 (see FIG. 5) contained within the OSA housing 74b. The optical components of the bidirectional transceiver inside each TO can 72 include a laser device 44, a photodetector 48 and a WDM filter 46 as depicted in FIG. 4. FIG. 13 shows a side view of the assembled internal components of the pluggable active optical connector depicted in FIG. 12B, whereas FIGS. 14 and 15 show respective three-dimensional views of the assembled internal components of the pluggable active optical connector 32 depicted in FIG. 12B.

Figure 16:
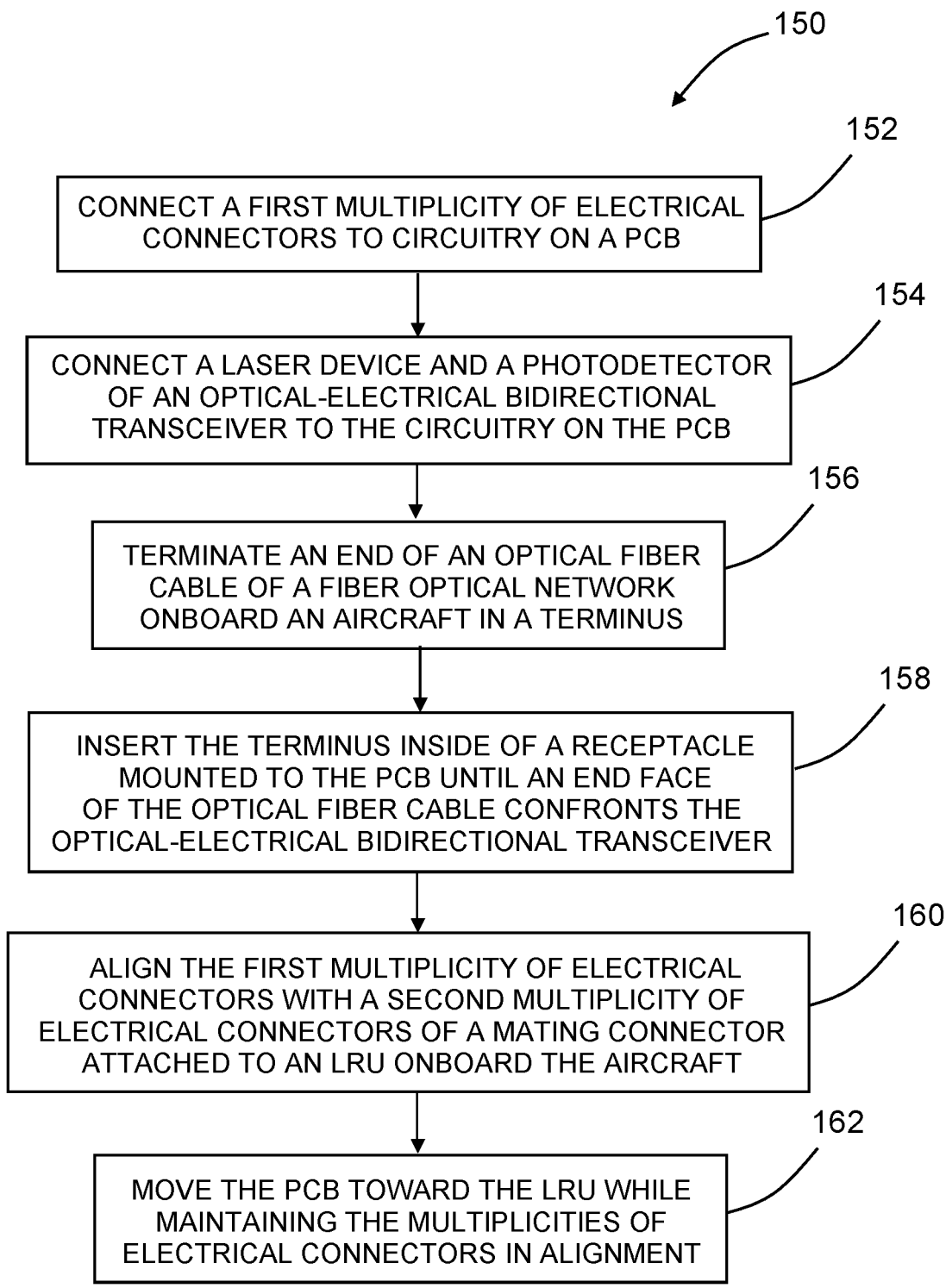
FIG. 16 is a flowchart identifying steps of a method for assembling an avionics data transmission system in accordance with one embodiment.

FIG. 16 is a flowchart identifying steps of a method 150 for assembling an avionics data transmission system in accordance with one proposed implementation. The method 150 performs the listed steps in the order indicated by arrows. However, in alternative implementations, the steps could be performed in accordance with an alternative ordering. The description that follows in the next paragraph will describe the steps of method 150 in order indicated by the arrows in FIG. 16. However, alternative sequencing of the various steps will be described at appropriate junctures.

Referring to FIG. 16, a first multiplicity of electrical connectors are connected to circuitry on a printed circuit board (step 152). After step 152, a laser device and a photodetector of an optical-electrical bidirectional transceiver are connected to the circuitry on the printed circuit board (step 154). (In the alternative, step 154 may be performed before step 152.) After step 154, an end of an optical fiber cable of a fiber optical network onboard an aircraft is terminated in a terminus (step 156). (In the alternative, step 156 may be performed before step 154.) After step 156, the terminus is inserted inside of a receptacle mounted to the printed circuit board until an end face of the optical fiber cable is within a specified distance of and in a position confronting the optical-electrical bidirectional transceiver (step 158). After step 158, the first multiplicity of electrical connectors is aligned with a second multiplicity of electrical connectors of a mating connector attached to a line replaceable unit onboard the aircraft (step 160). After step 160, the printed circuit board is moved toward the line replaceable unit while maintaining the first and second multiplicities of electrical connectors in alignment (step 162), thereby connecting the first multiplicity of electrical connectors to the second multiplicity of electrical connectors. (In the alternative, steps 160 and 162 may be performed before step 158.)

The pluggable active optical connector 32 may be plugged in directly to an LRU that has an electrical interface compliant to the electrical pin-out definition of pluggable active optical connector 32. To accommodate an LRU that has a different electrical connector and pin-out definition (such as the electrical pins need to come from two connectors), the pluggable active optical connector 32 may be rail mounted near the LRU and a short electrical wiring harness can adapt to the different connectors.

Figure 17:
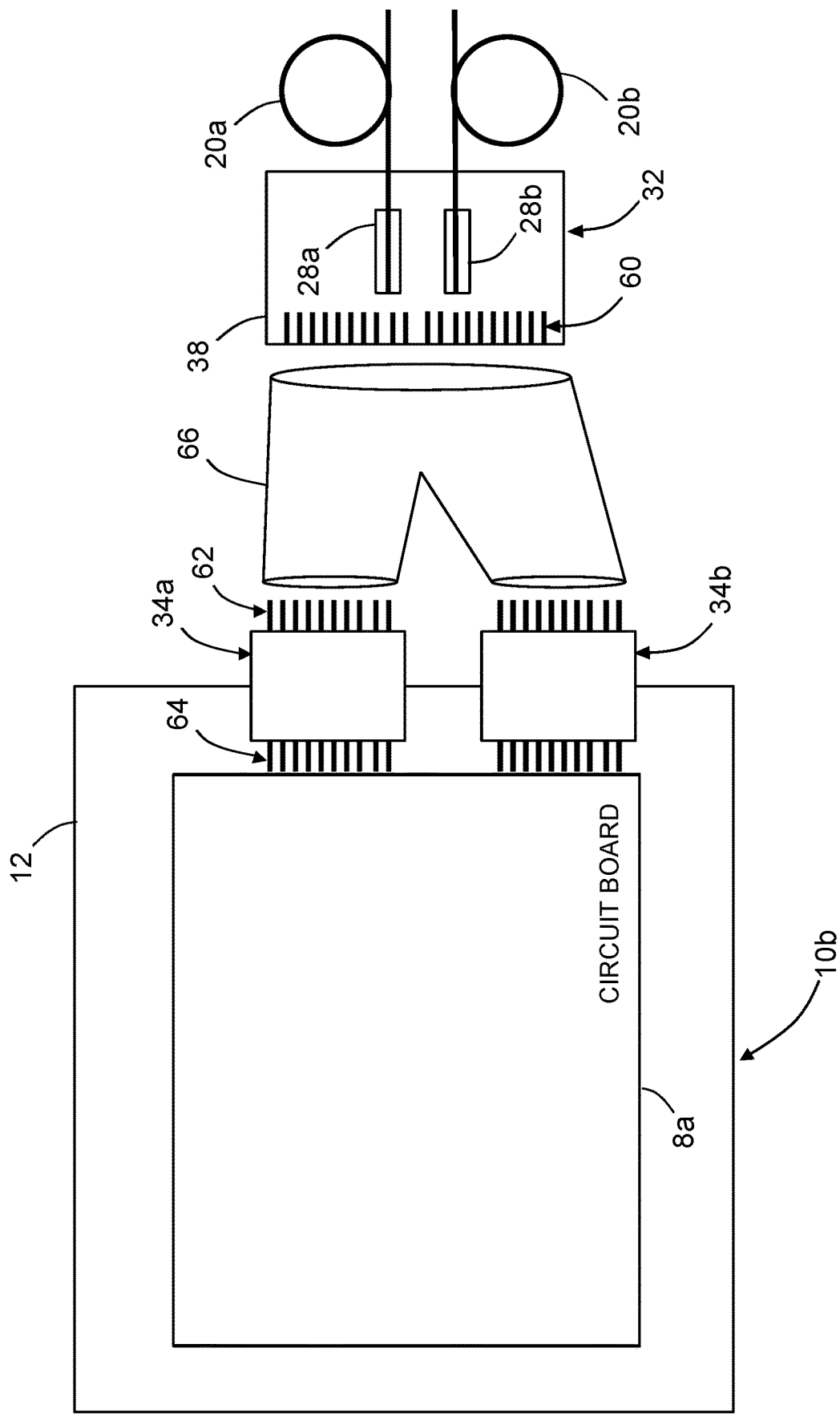
FIG. 17 is a diagram representing an electrical LRU that is able to receive data from and send data to optical fiber cables of an optical avionics data bus when an LRU-side connector and an aircraft-side pluggable active optical connector are electrically coupled using a short jumper cable in accordance with an alternative embodiment. For simplicity, the mating electrical pins and sockets of the jumper cable are not shown. (The connectors and jumper cable are shown in unmated states in FIG. 17.)

FIG. 17 is a diagram representing an electrical LRU 10b that is able to receive data from and send data to optical fiber cables 20a and 20b of an optical avionics data bus when two LRU-side connectors 34a and 34b are electrically coupled to an aircraft-side pluggable active optical connector 32 using a short jumper cable 66 in accordance with an alternative embodiment. The connectors 34a, 34b and 32 and the jumper cable 66 are shown in unmated states in FIG. 17. The jumper cable 66 is an electrical cable with generic (non-compliant) connectors (not shown since it can be any type that mates with an existing LRU connector type) at one end and with specific connector mating to the pluggable active optical connector 32 at the other end.

An alternative that will result in shorter and simpler module is to replace the pluggable optical contact with a short-length optical pigtail (permanently epoxied the fiber to the OSA). The disadvantage of a pigtailed alternative is that a failure with the pigtail fiber itself can result in a throw-away of the whole module.

FIG. 18 is a diagram representing an electrical LRU 10b that is able to receive data from and send data to optical fiber cables 20a and 20b of an optical avionics data bus when an LRU-side connector 34 and an aircraft-side pluggable active optical connector 32 having pigtails 58a and 58b epoxied thereto are mated in accordance with a further alternative embodiment. The connectors are shown in an unmated state in FIG. 18. A pigtail is an fiber optic cable that is permanently aligned and attached (by epoxy) to the OSA 4 (not shown in FIG. 18, but see FIG. 4) without the need of a receptacle connector (no need for plug and unplug so there is no terminus at the OSA connection). There is a terminus (not shown in the drawings at the other end of the pigtail for aircraft inline connection.

While pluggable active optical connectors have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. A pluggable active optical connector comprising:
a connector housing;
a first printed circuit board contained within the connector housing;
a first multiplicity of electrical connectors electrically coupled to and supported by the first printed circuit board;
a first bidirectional optical sub-assembly contained within the connector housing and comprising a first laser device and a first photodetector which are electrically coupled to the first printed circuit board and a first housing mounted to the first printed circuit board, the first housing being a single housing comprising a first receptacle that is configured to receive the first laser device and first photodetector and a second receptacle that is configured to receive one end of a first terminus that terminates a first optical cable, the first receptacle of the first housing being integrally formed or rigidly affixed to the second receptacle of the first housing;
a second printed circuit board contained within the connector housing;
a second multiplicity of electrical connectors electrically coupled to and supported by the second printed circuit board;
a second bidirectional optical sub-assembly comprising a second laser device and a second photodetector which are electrically coupled to the second printed circuit board and a second housing mounted to the second printed circuit board, the second housing being a single housing comprising a first receptacle that is configured to contain the second laser device and second photodetector and a second receptacle that is configured to receive one end of a second terminus that terminates a second optical cable, the first receptacle of the second housing being integrally formed or rigidly affixed to the second receptacle of the second housing,
wherein the first laser device is electrically coupled to a first pair of electrical connectors of the first multiplicity of electrical connectors and arranged to transmit light through the first housing to an end of a first optical fiber in response to electrical signals received via the first pair of electrical connectors of the first multiplicity of electrical connectors;
wherein the first photodetector is electrically coupled to a second pair of electrical connectors of the first multiplicity of electrical connectors and arranged to send electrical signals to the second pair of electrical connectors of the first multiplicity of electrical connectors in response to receipt of light from the end of the first optical fiber;
wherein the second laser device is electrically coupled to a first pair of electrical connectors of the second multiplicity of electrical connectors and arranged to transmit light through the second housing to an end of a second optical fiber in response to electrical signals received via the first pair of electrical connectors of the second multiplicity of electrical connectors; and
wherein the second photodetector is electrically coupled to a second pair of electrical connectors of the second multiplicity of electrical connectors and arranged to send electrical signals to the second pair of electrical connectors of the second multiplicity of electrical connectors in response to receipt of light from the end of the second optical fiber.

2. The pluggable active optical connector as recited in claim 1, wherein the first multiplicity of electrical connectors are electrical sockets.

3. The pluggable active optical connector as recited in claim 1, wherein the first bidirectional optical sub-assembly further comprises a wavelength-division multiplexing filter which is optically coupled to the first laser device and first photodetector.

4. The pluggable active optical connector as recited in claim 1, wherein the first bidirectional optical sub-assembly further comprises:
a first wavelength-division multiplexing filter which is optically coupled to the first laser device and first photodetector; and a second wavelength-division multiplexing filter which is optically coupled to the second laser device and second photodetector.

5. The pluggable active optical connector as recited in claim 3, wherein the first bidirectional optical sub-assembly further comprises:
a can that is disposed inside the first receptacle, contains the first laser device, first photodetector, and wavelength-division multiplexing filter, and has a window; and
a lens installed in the window.

6. A data transmission system comprising:
a fiber optical network comprising a plurality of pairs of optical fiber cables and a plurality of pairs of termini, each terminus terminating an end of a respective optical fiber cable;
a plurality of electronic devices;
a plurality of mating connectors which are respectively attached and electrically coupled to the plurality of electronic devices, each mating connector having first and second multiplicities of electrical connectors; and
a plurality of pluggable active optical connectors which are respectively attached and electrically coupled to the plurality of mating connectors, attached to the plurality of pairs of termini, and optically coupled to the plurality of pairs of optical fiber cables,
wherein each of the plurality of pluggable active optical connectors comprises a respective connector housing, a respective pair of printed circuit boards contained within the respective connector housing, and a respective pair of optical-electrical bidirectional transceivers optically coupled to the respective pair of optical fiber cables, electrically coupled to the respective pair of printed circuit boards, and contained within the respective connector housing, and
wherein each optical-electrical bidirectional transceiver comprises a respective laser device, a respective photodetector, and a respective single housing comprising a first receptacle that is configured to receive the respective laser device and respective photodetector and a second receptacle that is integrally formed with the first receptacle and configured to receive one end of the respective terminus of the respective pair of termini, the first receptacle of the respective single housing being integrally formed or rigidly affixed to the second receptacle of the respective single housing.

7. The data transmission system as recited in claim 6, wherein each bidirectional optical sub-assembly further comprises:
a can that is disposed inside the respective housing, contains the respective laser device and the respective photodetector, and has a window; and
a lens installed in the window.

8. The data transmission system as recited in claim 6, wherein the electronic devices are line replaceable units.

9. The data transmission system as recited in claim 8, wherein the line replaceable units are installed on an aircraft.

10. The data transmission system as recited in claim 6, wherein each optical-electrical bidirectional transceiver further comprises a respective wavelength-division multiplexing filter which is optically coupled to the respective laser device and the respective photodetector.

11. The data transmission system as recited in claim 10, wherein each optical-electrical bidirectional transceiver further comprises:

a pair of data input terminals electrically coupled to respective electrical connectors of one mating connector; and
a laser driver electrically coupled to the pair of data input terminals and to the laser device.

12. The data transmission system as recited in claim 11, wherein each optical-electrical bidirectional transceiver further comprises:
a pair of data output terminals electrically coupled to respective electrical connectors of the one mating connector; and
a transimpedance amplifier electrically coupled to the pair of data output terminals and to the photodetector.

13. A data transmission system comprising:
a fiber optical network comprising a plurality of pairs of optical fiber cables and a plurality of pairs of termini, each terminus terminating an end of a respective optical fiber cable;
a plurality of electronic devices;
a plurality of mating connectors which are respectively attached and electrically coupled to the plurality of electronic devices, each mating connector having first and second multiplicities of electrical connectors; and
a plurality of pluggable active optical connectors which are respectively attached and electrically coupled to the plurality of mating connectors and respectively optically coupled to the fiber optical network,
wherein each of the plurality of pluggable active optical connectors comprises:
a connector housing;
first and second printed circuit boards contained within the connector housing;
third and fourth multiplicities of electrical connectors electrically coupled to and supported by the printed circuit board and electrically coupled to the first and second multiplicities of electrical connectors respectively;
first and second bidirectional optical sub-assemblies contained within the connector housing, the first bidirectional optical sub-assembly comprising a laser device and a photodetector which are electrically coupled to the first printed circuit board and a first housing mounted to the first printed circuit board, the second bidirectional optical sub-assembly comprising a laser device and a photodetector which are electrically coupled to the second printed circuit board and a second housing mounted to the second printed circuit board, each of the first and second housings being a single housing comprising a first receptacle that is configured to receive the laser device and the photodetector and a second receptacle that is integrally formed with the first receptacle and configured to receive one end of a terminus that terminates an optical cable, the first receptacle of the housing being integrally formed or rigidly affixed to the second receptacle of the housing,
wherein the laser devices of the first and second bidirectional optical sub-assemblies are electrically coupled to respective first pairs of electrical connectors of the third and fourth multiplicities of electrical connectors and optically coupled to transmit light to an end of a respective optical fiber in response to electrical signals received via the pair of electrical connectors of the third and fourth multiplicities of electrical connectors; and
wherein the photodetector is electrically coupled to respective second pairs of electrical connectors of the third and fourth multiplicities of electrical connectors and optically coupled to send electrical signals to the respective second pairs of electrical connectors of the third and fourth multiplicities of electrical connectors in response to receipt of light from the end of the respective optical fiber.

14. The data transmission system as recited in claim 13, wherein the third and fourth multiplicities of electrical connectors are electrical sockets.

15. The data transmission system as recited in claim 13, wherein each of the first and second bidirectional optical sub-assemblies further comprises a wavelength-division multiplexing filter which is optically coupled to the laser device and photodetector.

16. The data transmission system as recited in claim 13, wherein the electronic devices are line replaceable units.

17. The data transmission system as recited in claim 16, wherein the line replaceable units are installed on an aircraft.

18. The data transmission system as recited in claim 13, wherein each of the first and second bidirectional optical sub-assemblies further comprises:
a can that is disposed inside the housing, contains the laser device and photodetector, and has a window; and
a lens installed in the window.

19. The data transmission system as recited in claim 15, wherein each of the first and second bidirectional optical sub-assemblies further comprises:
a can that is disposed inside the housing, contains the laser device and photodetector, and has a window; and
a lens installed in the window.

20. The pluggable active optical connector as recited in claim 1, wherein each of the first and second bidirectional optical sub-assemblies further comprises:
a can that is disposed inside the housing, contains the laser device and photodetector, and has a window; and
a lens installed in the window.

* * * * *